United States Patent

Bessone et al.

[11] Patent Number: 6,132,102
[45] Date of Patent: Oct. 17, 2000

[54] RETAINING STRUCTURE FOR RETAINING ROLLING BODIES OF A ROLLING BEARING, IN PARTICULAR A CYLINDRICAL ROLLER BEARING

[75] Inventors: Mario Bessone, Pinerolo; Giampaolo Casazza, San Secondo Di Pinerolo, both of Italy

[73] Assignee: SKF Industrie S.p.A., Turin, Italy

[21] Appl. No.: 09/116,929

[22] Filed: Jul. 17, 1998

[30] Foreign Application Priority Data

Jul. 18, 1997 [IT] Italy .................................. TO97A0651

[51] Int. Cl.[7] ................................................. F16C 33/46
[52] U.S. Cl. ............................ 384/576; 384/572; 384/580
[58] Field of Search .................................. 384/572, 573, 384/574, 575, 576, 577, 578, 579, 580, 470

[56] References Cited

U.S. PATENT DOCUMENTS

| | | | |
|---|---|---|---|
| 1,840,607 | 1/1932 | Scribner | 384/565 |
| 2,805,108 | 9/1957 | Palmgren | 384/580 |
| 2,946,633 | 7/1960 | Göthberg | 384/576 |
| 3,051,534 | 8/1962 | Kohler et al. | 384/576 |
| 3,873,056 | 3/1975 | Parkinson | 249/142 |
| 5,772,338 | 6/1998 | Hillmann et al. | 384/576 X |

FOREIGN PATENT DOCUMENTS

| | | |
|---|---|---|
| 2198570 | 3/1974 | France . |
| 2368635 | 5/1978 | France . |
| 826387 | 1/1952 | Germany . |
| 86 19 749 | 11/1990 | Germany . |
| 57163727 | 10/1992 | Japan . |
| 335261 | 2/1959 | Switzerland . |
| 1388645 | 3/1975 | United Kingdom ................... 384/572 |

*Primary Examiner*—Thomas R. Hannon
*Attorney, Agent, or Firm*—Burns, Doane, Swecker & Mathis, L.L.P.

[57] ABSTRACT

A rolling bearing, having, for example, cylindrical rollers, is provided, between an inner ring and an outer ring, with a retaining structure for retaining the rollers. The retaining structure includes an annular retainer having a number of seats for click-in insertion of the rollers, and from an end edge of which projects a radially outer flange having a sliding surface cooperating in sliding manner with a radially inner surface of the outer ring of the bearing to support the annular retainer in a radially inner position with respect to the outer ring and so prevent the annular retainer from sliding against the rollers. The seats for the rollers each have a pair of axial projections for compensating any axial clearance between the rollers and the respective seats.

16 Claims, 2 Drawing Sheets

RETAINING STRUCTURE FOR RETAINING ROLLING BODIES OF A ROLLING BEARING, IN PARTICULAR A CYLINDRICAL ROLLER BEARING

BACKGROUND OF THE INVENTION

The present invention relates to a retaining structure for retaining rolling bodies of a rolling bearing, in particular a cylindrical roller bearing.

Rolling bearings are known in which the rolling bodies, in particular rollers, are housed inside seats formed in a retaining structure interposed between the inner ring and the outer ring of the bearing. In known bearings, the edges of the seats in the rolling body retainer rest directly on the rolling bodies, so that the retainer is in sliding contact with, and slides at high speed against, the rolling bodies, thus resulting in severe friction directly proportional to the rotation speed of the rolling bodies. This type of retainer therefore generates severe friction between its own structure and the rolling bodies, thus making it necessary to limit the operating speed of the bearing to which it is fitted.

What is more, known retainers are normally relatively thick.

SUMMARY OF THE INVENTION

It is an object of the present invention to eliminate the above drawbacks typically associated with known retaining structures for retaining the rolling bodies of a bearing. More specifically, it is an object of the present invention to provide a retaining structure, which provides for reducing friction with the rolling bodies, thus enabling an increase in the rotation speed of the bearing, and which at the same time is of limited thickness.

According to the present invention, there is provided a retaining structure for retaining rolling bodies of a rolling bearing, the retaining structure being housed radially between an inner ring and an outer ring of said rolling bearing, and comprising a substantially rigid annular retainer having a number of radially through seats for insertion of said rolling bodies; characterized by also comprising guide means integral with said annular retainer and having at least one sliding surface cooperating in sliding manner with a radially inner surface of said outer ring of the rolling bearing to support said annular retainer in a radially inner position with respect to said outer ring.

More specifically, said guide means comprise at least one radially outer flange projecting radially outwards from an end edge of said annular retainer, and having a radially outer edge comprising said sliding surface.

The retaining structure according to the invention, in whose seats the rolling bodies are inserted, is therefore housed between the inner and outer rings of the bearing, and is centered radially on the outer ring by its own radial flange. Though the flange is in sliding contact with the inner surface of the outer ring, the relative speed between the sliding surfaces is fairly low, so that friction between the surfaces is limited, and friction on the retainer is significantly reduced during operation of the bearing, which may thus be operated at greater speed.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
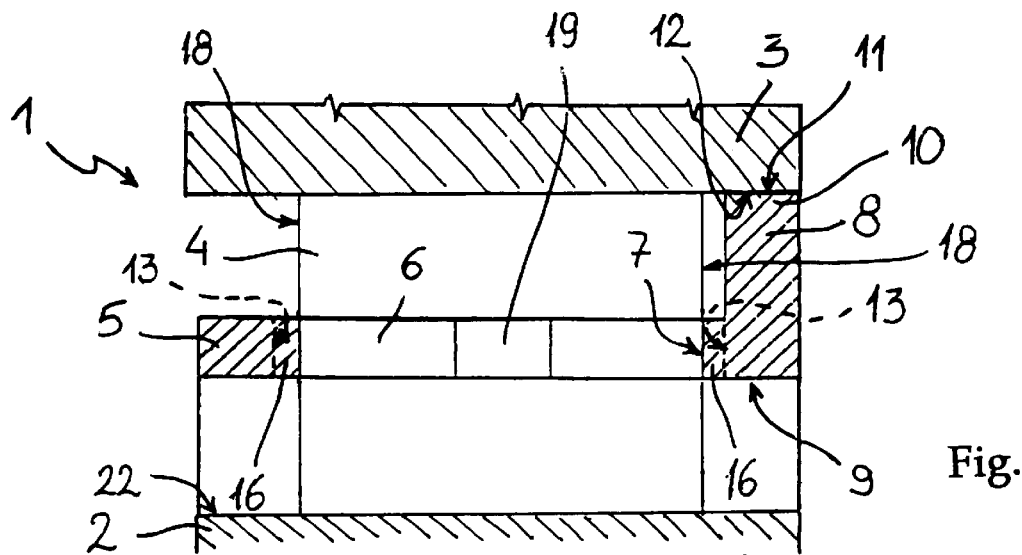
FIG. 1 shows a partial radial section of a rolling bearing fitted with a rolling body retaining structure in accordance with the present invention.
Figure 2:
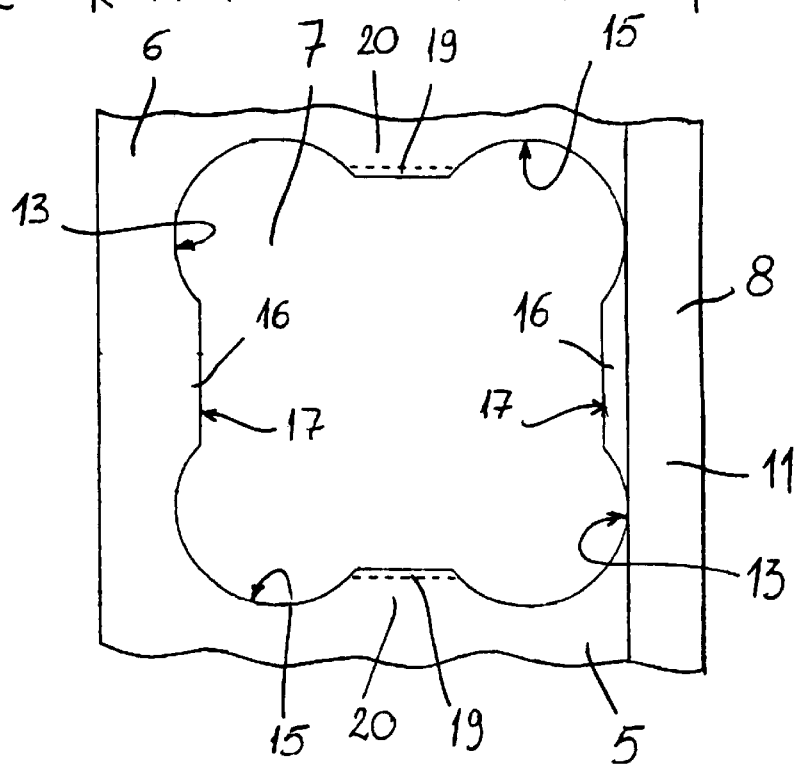
FIG. 2 shows a detail of the FIG. 1 retaining structure.
Figure 3:
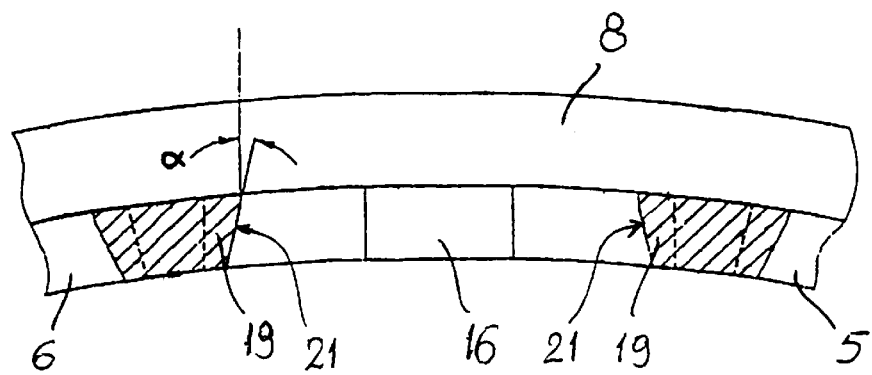
FIG. 3 shows a partial cross section of the FIG. 1 retaining structure.

With reference to FIGS. 1 to 3, a rolling bearing 1 comprises an inner ring 2 and an outer ring 3, between which is interposed a predetermined number of rolling bodies, e.g. cylindrical rollers, 4; and a retaining structure 5 for retaining said rollers, and which is housed radially between inner ring 2 and outer ring 3 of bearing 1.

Retaining structure 5 comprises a substantially rigid annular retainer 6 having a number of radially through seats 7 for insertion of rollers 4, and made for example of sheet metal or relatively rigid polymeric or composite material, such as PEEK (polyether ethyl ketone).

According to the present invention, retaining structure 5 also comprises a radially outer flange 8 projecting radially outwards from an end edge 9 of annular retainer 6, and having, on a respective radially outer edge 10, a substantially cylindrical sliding surface 11 cooperating, in use, in sliding manner with a radially inner lateral surface 12 of outer ring 3 of bearing 1. For which purpose, the outside diameter of flange 8 is such as to allow a small radial clearance between flange 8 and outer ring 3 of bearing 1 ("running" fit).

Each of seats 7 for the insertion of rollers 4 is defined by a first pair of opposite walls 13 substantially perpendicular to the axis of bearing 1, and by a second pair of opposite walls 15 substantially perpendicular to walls 13 and therefore parallel to the axis of bearing 1. The profile of pairs of opposite walls 13 and 15 may be of any shape, depending on the machining operations by which seats 7 are formed : in the non-limiting example shown in FIGS. 1 to 3, for example, retaining structure 5 is made of sheet steel, and seats 7 are milled and therefore of a particular four-leaf-clover shape.

According to the invention, each seat 7 comprises a pair of axial projections 16 extending axially towards each other from respective first opposite walls 13 defining the seat (i.e. the walls perpendicular to the axis of bearing 1). More specifically, axial projections 16 are of a circumferential dimension smaller than that of walls 13 from which they extend; are of a radial extension, in the non-limiting example shown in FIGS. 1 to 3, substantially equal to the radial thickness of annular retainer 6; and have respective substantially flat, parallel front faces 17 facing each other and which, in use, cooperate in axially contacting manner with respective axial end faces 18 of rollers 4. For which purpose, the axial extension of projections 16 is such as to define, in use, a small amount of clearance or even a limited amount of interference between projections 16 and faces 18 of rollers 4.

The second pair of opposite walls 15 (parallel to the axis of bearing 1) defining each seat 7 comprises a pair of stop teeth 19 for arresting rollers 4, and which project circumferentially from respective axially central portions 20 of walls 15. Teeth 19 are of an axial dimension smaller than that of walls 15 from which they extend, and have respective substantially flat front faces 21 facing each other and inclined at a predetermined angle a with respect to the radial direction.

Front faces 21 of teeth 19 are preferably inclined with respect to the radial direction by an angle ranging approximately between 5° and 18°: in a preferred embodiment, the angle of inclination is approximately 12°. In the non-limiting embodiment shown in FIGS. 1 to 3, teeth 19, like projections 16, are of a radial extension substantially equal to the radial thickness of annular retainer 6, and preferably have a predetermined degree of elasticity.

According to the present invention, the inside diameter of retaining structure 5, i.e. of annular retainer 6, is substantially equal to the mean diameter of bearing 1, i.e. the so-called "pitch" diameter of the bearing, defined as the diameter of the imaginary circle defined by the axes of rotation of rollers 4 in the rotation plane of bearing 1.

In actual use, rollers 4 are interposed radially, as is known, between inner ring 2 and outer ring 3 of bearing 1, and mate in rotary manner with a radially outer lateral surface 22 of inner ring 2 and with inner lateral surface 12 of outer ring 3, which define the rolling surfaces of rollers 4. Retaining structure 5, in whose seats 7 rollers 4 are inserted, is also housed between inner ring 2 and outer ring 3, and is centered radially with respect to the inner and outer rings by flange 8, the cylindrical surface 11 of which mates, with a small amount of radial clearance, with inner lateral surface 12 of outer ring 3. As opposed to being centered directly on rolling bodies 4, as in known solutions, retaining structure 5 according to the invention is centered on outer ring 3 by flange 8, the surface 11 of which is in sliding contact with inner surface 12 of ring 3. The relative speed between sliding surfaces 11 and 12, however, is fairly low, so that friction between the surfaces is also limited, and friction on retaining structure 5 is significantly reduced during operation of bearing 1, which may thus be operated at greater speed.

In other words, in actual use, surface 11 of flange 8 of retaining structure 5 according to the invention mates frictionally and in rotary manner with inner lateral surface 12 of outer ring 3, while sliding contact between retaining structure 5 and rollers 4 is restricted solely to the small contacting surfaces of front faces 21 of teeth 19 and the lateral surfaces of the rollers.

Contact between axial projections 16 of retaining structure 5 and end faces 18 of rollers 4 also involves only a small amount of friction. As stated, in fact, projections 16 are of a circumferential dimension smaller than that of walls 13 from which they extend, so that faces 18 of each roller 4 are only in sliding contact with the small front faces 17 of projections 16; which sliding contact, moreover, occurs substantially at the axis of each roller 4 and therefore at low relative speed and with a limited amount of friction. Axial projections 16 also provide for reducing or compensating for any axial clearance between rollers 4 and respective seats 7.

Even in the event outer ring 3 is removed, e.g. to service bearing 1, rollers 4 are retained radially inside respective seats 7 by stop teeth 19. That is, when outer ring 3 is removed, the rollers tend to fall by force of gravity off inner ring 2, but are prevented by teeth 19 from withdrawing from seats 7 by rollers 4 resting on inclined faces 21 of teeth 19, along contact surfaces located radially outwards with respect to the roller axes.

The particular design of retaining structure 5 according to the invention and the elasticity of teeth 19 enable rollers 4, during assembly, to be clicked inside respective seats 7 after fitting retaining structure 5 to the outside of inner ring 2 of bearing 1. Once rollers 4 are inserted inside seats 7 and positioned contacting outer lateral surface 22 of inner ring 2, teeth 19 click back into position to radially retain rollers 4. Alternatively, rollers 4 may be inserted inside respective seats 7, from inside annular retainer 6 of retaining structure 5, before the retaining structure is fitted to inner ring 2, and therefore with no need to force or deform teeth 19. In which case, rollers 4 are retained radially inside seats 7 by subsequent insertion of inner ring 2 inside annular retainer 6.

Figure 4:
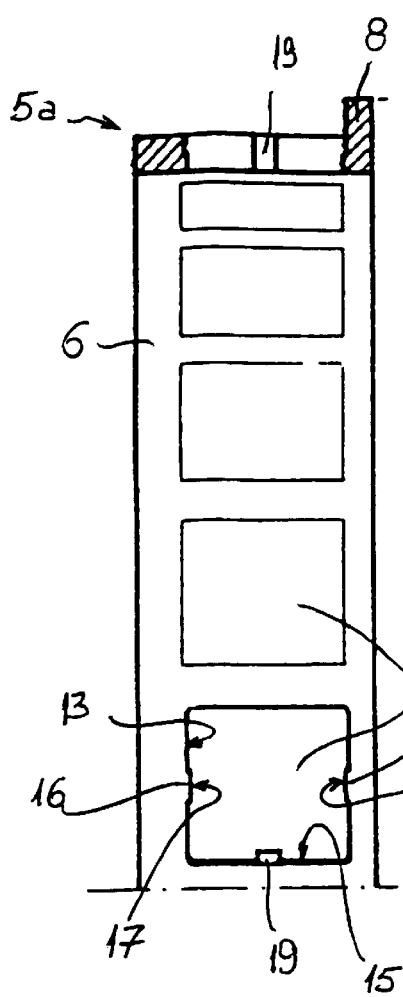
FIG. 4 shows a partial radial section of a first variation of the FIG. 1 retaining structure.
Figure 5:
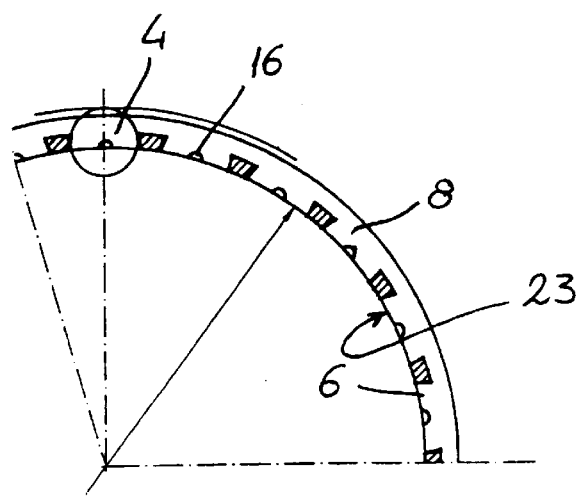
FIG. 5 shows a partial cross section of the FIG. 4 variation.
Figure 6:
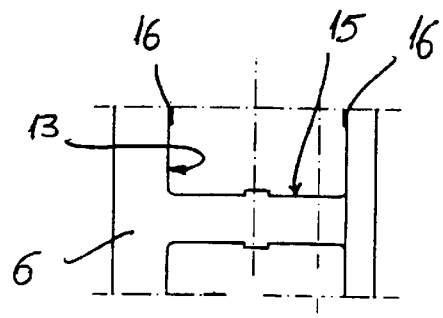
FIG. 6 shows a detail of the FIG. 4 variation.

FIGS. 4 to 6, in which any details similar or identical to those already described are indicated using the same numbering system, show a variation 5a of the retaining structure according to the invention, which is preferably molded from polymeric or composite material, e.g. PEEK (polyether ethyl ketone) with a glass, PTFE or graphite filler. Retaining structure 5a is identical to retaining structure 5 described with reference to FIGS. 1 to 3, apart from the different shape of pairs of opposite walls 13 and 15 defining seats 7 for the insertion of rolling bodies 4, and the fact that each seat 7 of retaining structure 5a comprises a pair of axial projections 16 of a radial extension smaller than that of walls 13 from which they extend (and therefore smaller than that of annular retainer 6), and located at a radially inner lateral surface 23 of annular retainer 6, so as to further reduce, close to the axes of rollers 4, the contact surface between faces 18 of the rollers and front faces 17 of projections 16.

Figure 7:
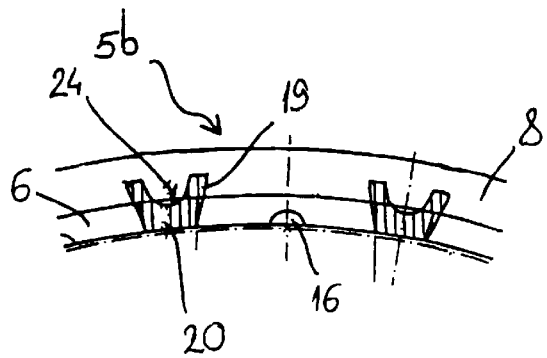
FIG. 7 shows a further variation of the FIG. 1 retaining structure.
Figure 8:
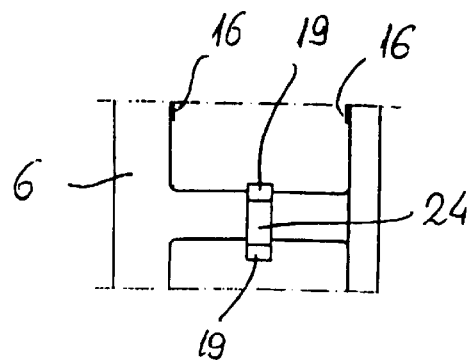
FIG. 8 shows a detail of the FIG. 7 variation.

FIGS. 7 and 8 show a further variation 5b of the retaining structure according to the invention, in which the axially central portions 20 of walls 15 circumferentially defining seats 7 comprise weight-reducing grooves 24 of an axial dimension substantially equal to that of teeth 19 which extend from central portions 20. Also, teeth 19 are of a radial extension greater than that of annular retainer 6, and therefore extend radially outwards of a radially outer lateral surface of annular retainer 6. Both weight-reducing grooves 24 and the radial dimension of teeth 19 provide for increasing the elasticity of teeth 19 when clicking rollers 4 inside seats 7.

Clearly, further changes may be made to the retaining structure as described and illustrated herein without, however, departing from the scope of the accompanying claims.

What is claimed is:

1. A retaining structure for retaining rolling bodies of a rolling bearing, the retaining structure being adapted to be housed radially between an inner ring and an outer ring of said rolling bearing and comprising a substantially rigid annular retainer having a number of radially through seats for insertion of said rolling bodies, said guide means integral with said annular retainer and having at least one sliding surface for cooperating in a sliding manner with a radially inner surface of said outer ring of the rolling bearing to support said annular retainer in a radially inner position with respect to said outer ring, each of said seats for insertion of said rolling bodies comprising a pair of axial projections extending axially towards each other from respective opposite first walls facing each other and axially defining said seat, said opposite first walls being substantially perpendicular to an axis of said bearing.

2. A retaining structure as claimed in claim 1, wherein said guide means comprise at least one radially outer flange projecting radially outwards from an end edge of said annular retainer, and having a radially outer edge comprising said sliding surface.

3. A retaining structure as claimed in claim 1, wherein each of said seats for insertion of said rolling bodies comprises a pair of snap-on retaining teeth for retaining said rolling bodies, said teeth projecting circumferentially from respective opposite second walls substantially facing each other and circumferentially defining said seat, said second walls being adapted to be substantially parallel to an axis of said bearing.

4. A retaining structure as claimed in claim 3, wherein said teeth comprise respective substantially flat front faces facing each other and having a predetermined angle of inclination with respect to the radial direction, said predetermined angle of inclination with respect to the radial direction ranging between approximately 5° and approximately 18°.

5. A retaining structure as claimed in claim 4, wherein said predetermined angle of inclination of said front faces of said teeth with respect to the radial direction is approximately 12°.

6. A retaining structure as claimed in claim 3, wherein said axial projections have a circumferential dimension smaller than the circumferential dimension of said first walls, said teeth having an axial dimension smaller than the axial dimension of said second walls and extending from respective axially central portions of said second walls.

7. A retaining structure as claimed in claim 6, wherein said axial projections and said teeth are of a radial extension substantially equal to the radial thickness of said annular retainer.

8. A retaining structure as claimed in claim 6, wherein said axial projections are of a radial extension smaller than the radial thickness of said annular retainer and are located on said first walls axially defining said seats close to a radially inner lateral surface of said annular retainer.

9. A retaining structure as claimed in claim 6 wherein said teeth are of a radial extension greater than the radial thickness of said annular retainer and project radially outwards of a radially outer lateral surface of said annular retainer, said axially central portions of said second walls circumferentially defining said seats comprising weight-reducing grooves of an axial dimension substantially equal to that of said teeth.

10. A rolling bearing comprising an inner ring and an outer ring between which is interposed radially a number of rolling bodies; and a retaining structure as claimed in claim 1 for retaining said rolling bodies and housed between said inner ring and said outer ring of the bearing.

11. A retaining structure for retaining rolling bodies of a rolling, bearing, the retaining structure being adapted to be housed radially between an inner ring and an outer ring of said rolling bearing, and comprising a substantially rigid annular retainer having a number of radially through seats for insertion of said rolling bodies, and guide means integral with said annular retainer and having at least one sliding surface for cooperating in a sliding manner with a radially inner surface of said outer ring of the rolling bearing to support said annular retainer in a radially inner position with respect to said outer ring, said annular retainer having an inside diameter substantially equal to a mean diameter of said bearing defined as the diameter of an imaginary circle defined by rotation axes of said rolling bodies in a rotation plane of said bearing.

12. A rolling bearing comprising an inner ring and an outer ring between which is interposed radially a number of rolling bodies; and a retaining structure as claimed in claim 1 for retaining said rolling bodies and housed between said inner ring and said outer ring of the bearing.

13. A retaining structure as claimed in claim 11, wherein said guide means comprise at least one radially outer flange projecting radially outwards from an end edge of said annular retainer, and having a radially outer edge comprising said sliding surface.

14. A retaining structure as claimed in claim 11, wherein each of said seats for insertion of said rolling bodies includes a pair of projections extending towards each other from respective opposite first walls, each of said seats for insertion of said rolling bodies including a pair of snap-on retaining teeth for retaining said rolling bodies, said teeth projecting circumferentially from respective opposite second walls.

15. A retaining structure as claimed in claim 14, wherein said teeth comprise respective substantially flat front faces facing each other and having a predetermined angle of inclination with respect to the radial direction, said predetermined angle of inclination with respect to the radial direction ranging between approximately 5° and approximately 18°.

16. A retaining structure as claimed in claim 15, wherein said predetermined angle of inclination of said front faces of said teeth with respect to the radial direction is approximately 12°.

* * * * *